March 27, 1934.   T. V. BUCKWALTER   1,952,043
TRUCK
Filed Nov. 25, 1932
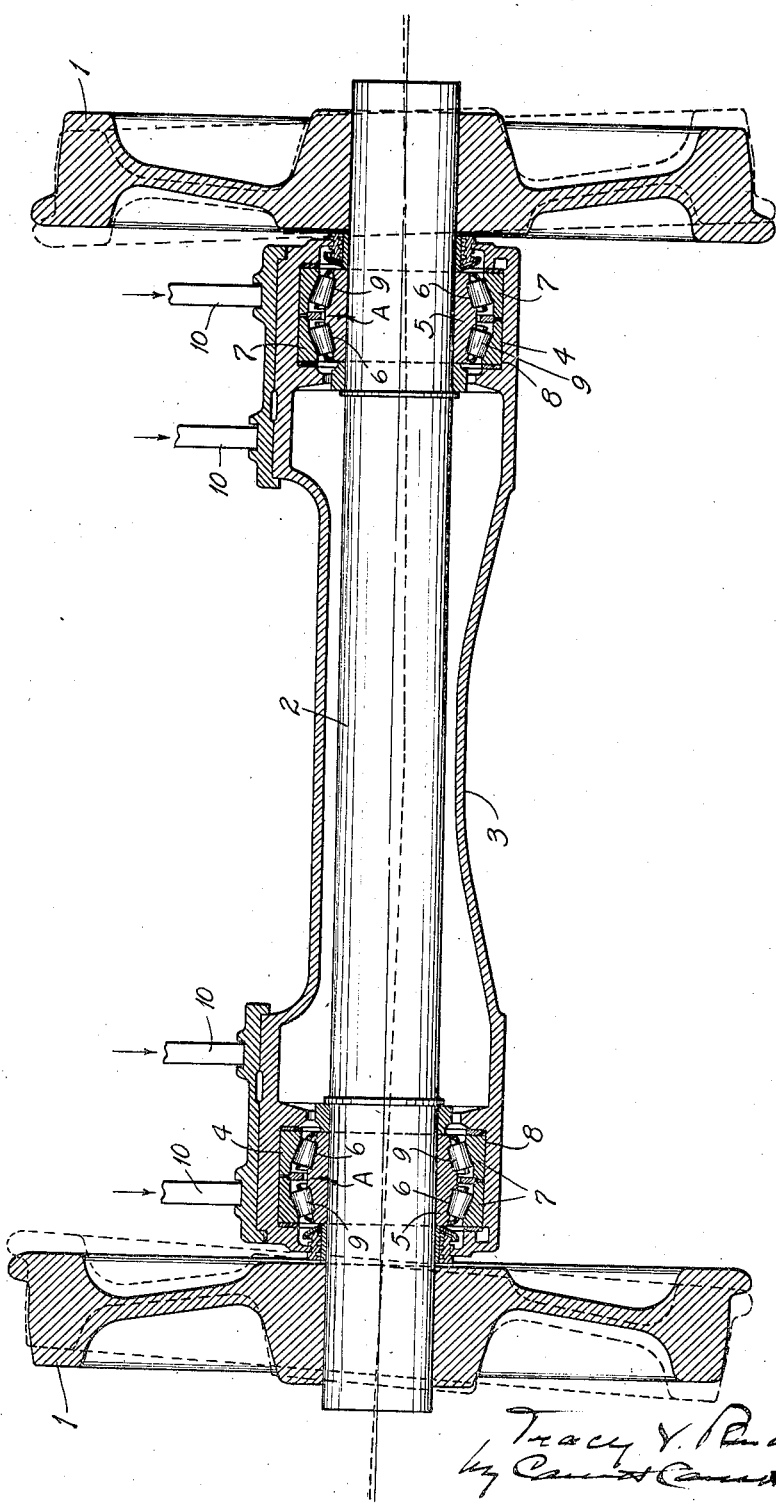
INVENTOR:
Tracy V. Buckwalter
by Cann & Cann
HIS ATTORNEYS.

Patented Mar. 27, 1934

1,952,043

UNITED STATES PATENT OFFICE 1,952,043

TRUCK

Tracy V. Buckwalter, Canton, Ohio, assignor to The Timken Roller Bearing Company, Canton, Ohio, a corporation of Ohio Application November 25, 1932, Serial No. 644,198

7 Claims. (Cl. 295—36)

My invention relates to trucks for railway cars and locomotives, and more particularly to trucks which have roller bearings interposed between the wheel axles and load carrying housings enclosing said axles. In truck constructions, there is a tendency for the outer bearing members to get out of axial alinement due to deflection of the axle or its housing under load; and the principal object of the present invention is to maintain the correct alinement of the bearing parts even when the axle and the axle housing deflect. The invention consists mainly in so correlating the parts that the axle and its housing will deflect substantially equally in the same direction under load and thereby preserve the alinement of the bearing.

In the accompanying drawing which forms part of this specification and wherein like reference numerals refer to like parts wherever they occur.

The drawing shows a vertical longitudinal sectional view of a railway axle construction conforming to my invention as it appears when free from load. Said view also shows by dotted lines the positions assumed by the axle and its housing when deflected by load.

In the construction illustrated, ordinary car locomotive wheels 1 are shown rigidly mounted on a solid axle 2 which is enclosed within a hollow housing 3 that extends substantially the full distance from wheel to wheel, with roller bearings 4 interposed between the ends of the housing and the portions of the axles enclosed thereby. In the construction illustrated, each roller bearing has a duplex cone or inner bearing member 5 mounted on the axle 2 with two conical raceway surfaces 6 disposed with their large ends towards each other. Two cups or outer raceway members 7 are fitted in seats 8 provided therefor in the ends of the housing; and in each raceway is a series of taper roller bearings 9 interposed between said cups and cones.

In the arrangement described, the load transmitted from the housing to the axle is applied at some distance inwardly from each wheel and, therefore, acts with a considerable moment arm tending to deflect said axle. In order to offset the effects of such deflection, it is desirable to apply the load to the housing in such way that the housing itself will deflect in the same direction and substantially to the same extent as the axle. For this purpose, part, at least, of the load on the housing is applied thereto further inwardly from the plane of the wheel than the point at which the housing transmits its load to the axle. By suitably correlating these factors, the housing will deflect in the same direction and substantially to the same extent as the axle; in consequence of which the members of the roller bearing will maintain their concentricity and proper operative relation with respect to one another.

In the construction illustrated, this is accomplished by using two equalizing bars 10 at each side of the truck with the ends of the bars seated on the truck housing on opposite sides of the assumed point of application of the housing load to the axle, which assumed point may be considered as being at the middle of the bearing as indicated at the point A. Accordingly, the seat for the end of one of the equalizing bars is located between the vertical plane passing through such point A and the plane of contact between the tread of the wheel and the rail head; and likewise, the seat for the end of the other equalizing bar is located on the other side of the point A, that is, between said point and the longitudinal middle of the axle. In the case shown, the seat for the inner equalizing bar is located a considerable distance inwardly from the bearing. The proper location may be more accurately determined by computing the deflections of the axle and of the housing under their respective loads and of designing them so that their deflections will be substantially equal. The effective load of the two equalizing members is transmitted from the housing to the axle at the point A so that the lever arm determining the bending movement of the axle may be considered as the distance from such point A to the plane of contact between the tread of the wheel and the rail head. On the other hand, the effective load of the two equalizing bars is transmitted to the housing tending to deflect the same at the point substantially midway between the two bars so that the lever arm determining the bending movement of the housing may be considered as the distance from such midway point to the point A.

While it is preferable to use two equalizing bars and to have the outer equalizing bars lie a slight distance outwardly from the point A in order to have a slight counterbending effect tending to straighten out the ends of the axle housing, in some cases where the axle may be made comparatively light with respect to the housing, it may be feasible to use a single side frame member located on the inside of the point of application A; or in other cases to use two equalizing bars, both of them being located on the inside of the assumed point of application A.

What I claim is:

1. A railway truck comprising wheeled axles, housings therefor extending substantially from wheel to wheel, roller bearings interposed between said axles and said housings inwardly from the wheels, and side frame members on each side of said truck inwardly from said bearings for transmitting the load of said truck to said housings, the points of application of the side frame loads to the housing being located at such distances inwardly from the points of support of such housing that the deflection of such housing is in the same direction and substantially equal to the deflection of the axle.

2. A railway truck comprising wheeled axles, housings therefor extending substantially from wheel to wheel, duplex taper roller bearings interposed between said axles and said housings inwardly from the wheels, and side frame members on each side of said truck located inwardly from said bearings in such positions that the effective load transmitted by the side frame members to the housings is transmitted thereto at a point which lies to the inside of the point where the load is transmitted from the housing through the bearings to the axle.

3. A railway truck comprising wheeled axles, housings therefor extending substantially from wheel to wheel, roller bearings disposed inwardly from the tread of the wheel between said axle and housings at each side of the truck, and side frame members bearing on said housings inwardly of said bearings to cause said housings to deflect in the same direction as the axles, the size and composition of the housings being selected to cause said housings to deflect substantially the same amount as the axles.

4. A railway truck comprising wheeled axles, housings therefor extending substantially from wheel to wheel, roller bearings interposed between said axles and housings inwardly from the wheels, and equalizing bars on each side of said truck with their ends bearing on the housings on opposite sides of the points at which the housing transmits its load to the axle, the inner bars being considerably further from such points than the outer bars whereby the housings tend to deflect with the axles.

5. A railway truck comprising wheeled axles, housings therefor extending substantially from wheel to wheel, duplex taper roller bearings disposed inwardly from the tread of the wheel between said axles and housings, and equalizing bars on each side of said truck with their ends bearing on the housings on opposite sides of the point at which the housing transmits its load to the axle, the inner bars being considerably further from such points than the outer bars whereby the housings tend to deflect with the axles.

6. A railway truck comprising wheeled axles, housings therefor extending substantially from wheel to wheel, duplex taper roller bearings disposed inwardly from the tread of the wheel between said axles and housings, and equalizing bars on each side of said truck, the ends of the outer bar resting on the housings above and within the vertical plane of the bearings and the ends of the inner bar resting on said housings inwardly of said bearings.

7. A railway truck comprising wheeled axles, housings therefor extending substantially from wheel to wheel, and roller bearings disposed inwardly from the tread of the wheel between said axles and housings and equalizing bars on each side of said truck with the ends of the outer bar resting on the housings above the bearings and the ends of the inner bar resting on said housings inwardly of said bearings and at such point that the axles and their housing will deflect equally under load applied to the housing.

TRACY V. BUCKWALTER.